(12) United States Patent
Tsubaki et al.

(10) Patent No.: US 10,865,494 B2
(45) Date of Patent: *Dec. 15, 2020

(54) ELECTROLYTIC CAPACITOR

(71) Applicant: PANASONIC INTELLECTUAL PROPERTY MANAGEMENT CO., LTD., Osaka (JP)

(72) Inventors: Yuichiro Tsubaki, Kyoto (JP); Tatsuji Aoyama, Yamaguchi (JP); Kazuyo Saito, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/725,752

(22) Filed: Dec. 23, 2019

(65) Prior Publication Data

US 2020/0141020 A1    May 7, 2020

Related U.S. Application Data

(63) Continuation of application No. 15/724,303, filed on Oct. 4, 2017, now Pat. No. 10,563,318.

(30) Foreign Application Priority Data

Oct. 31, 2016    (JP) .................................. 2016-213668

(51) Int. Cl.
*H01G 9/145* (2006.01)
*H01G 9/035* (2006.01)
(Continued)

(52) U.S. Cl.
CPC .............. *C25D 11/12* (2013.01); *C25D 11/08* (2013.01); *H01G 9/0036* (2013.01);
(Continued)

(58) Field of Classification Search
None
See application file for complete search history.

(56) References Cited

U.S. PATENT DOCUMENTS 10,563,318 B2 *   2/2020   Tsubaki ................. C25D 11/08
2002/0018940 A1   2/2002   Nirasawa et al.
(Continued)

FOREIGN PATENT DOCUMENTS

| WO | 2011/064939 A1 | 6/2011 |
| WO | 2011/099261 A1 | 8/2011 |
| WO | 2014/021333 A1 | 2/2014 |

OTHER PUBLICATIONS

Non-Final Office Action issued in U.S. Appl. No. 15/724,303, dated Jul. 26, 2018.
(Continued)

*Primary Examiner* — Dion Ferguson
(74) *Attorney, Agent, or Firm* — McDermott Will & Emery LLP

(57) ABSTRACT

An electrolytic capacitor includes an anode body having a dielectric layer; a solid electrolyte layer in contact with the dielectric layer of the anode body; and an electrolyte solution. The solid electrolyte layer includes a π-conjugated conductive polymer. The electrolyte solution contains a solvent and a solute, and the solvent contains a glycol compound and a sulfone compound. A proportion of the glycol compound contained in the solvent is 10% by mass or more. A proportion of the sulfone compound contained in the solvent is 30% by mass or more. A total proportion of the glycol compound and the sulfone compound contained in the solvent is 70% by mass or more.

17 Claims, 4 Drawing Sheets

(51) Int. Cl.
*C25D 11/12* (2006.01)
*C25D 11/08* (2006.01)
*H01G 9/00* (2006.01)
*H01G 9/022* (2006.01)
*H01G 9/028* (2006.01)
*H01G 9/032* (2006.01)
*H01G 9/04* (2006.01)
*H01G 9/055* (2006.01)
*H01G 9/07* (2006.01)
*H01G 9/15* (2006.01)
*C25D 11/06* (2006.01)
*C25D 11/16* (2006.01)

(52) U.S. Cl.
CPC ............ *H01G 9/022* (2013.01); *H01G 9/028* (2013.01); *H01G 9/032* (2013.01); *H01G 9/035* (2013.01); *H01G 9/04* (2013.01); *H01G 9/055* (2013.01); *H01G 9/07* (2013.01); *H01G 9/145* (2013.01); *H01G 9/151* (2013.01); *C25D 11/06* (2013.01); *C25D 11/16* (2013.01)

(56) References Cited

U.S. PATENT DOCUMENTS

| | | |
|---|---|---|
| 2003/0152838 A1 | 8/2003 | Takeda et al. |
| 2012/0235072 A1 | 9/2012 | Nishitani et al. |
| 2012/0300368 A1* | 11/2012 | Matsuura ............... H01G 9/145 361/506 |
| 2015/0213962 A1 | 7/2015 | Koseki et al. |
| 2016/0240323 A1 | 8/2016 | Chacko et al. |
| 2016/0336117 A1 | 11/2016 | Koseki et al. |
| 2016/0379760 A1 | 12/2016 | Wright et al. |
| 2017/0053745 A1 | 2/2017 | Aoyama et al. |
| 2017/0092426 A1 | 3/2017 | Aoyama et al. |

OTHER PUBLICATIONS

Final Office Action issued in U.S. Appl. No. 15/724,303, dated Jan. 18, 2019.
Non-Final Office Action issued in U.S. Appl. No. 15/724,303, dated Jun. 25, 2019.
Notice of Allowance issued in U.S. Appl. No. 15/724,303, dated Oct. 2, 2019.

* cited by examiner

ELECTROLYTIC CAPACITOR

CROSS-REFERENCE OF RELATED APPLICATIONS

This application is a Continuation of U.S. patent application Ser. No. 15/724,303, filed on Oct. 4, 2017, which claims the benefit of Japanese Application No. 2016-213668, filed on Oct. 31, 2016, the entire disclosures of which Applications are incorporated by reference herein.

BACKGROUND

1. Technical Field

The present disclosure relates to an electrolytic capacitor including a solid electrolyte layer and an electrolyte solution.

2. Description of the Related Art

As small-sized, large capacitance, and low ESR (Equivalent Series Resistance) capacitors, promising candidates are electrolytic capacitors including an anode body on which a dielectric layer is formed, a solid electrolyte layer formed so as to cover at least a part of the dielectric layer, and an electrolyte solution. The solid electrolyte layer includes a π-conjugated conductive polymer.

From the viewpoint of reducing the ESR of the electrolytic capacitor, PCT International Publication No. 2014/021333 proposes that the electrolyte solution contain as a solvent ethylene glycol and γ-butyrolactone. For example, PCT International Publication No. 2014/021333 proposes an electrolyte solution containing a solvent that includes ethylene glycol, γ-butyrolactone, and sulfolane at ratios of 20% by mass, 40% by mass, and 40% by mass, respectively.

SUMMARY

An electrolytic capacitor of the present disclosure includes an anode body having a dielectric layer; a solid electrolyte layer in contact with the dielectric layer of the anode body; and an electrolyte solution. The solid electrolyte layer includes a π-conjugated conductive polymer. The electrolyte solution contains a solvent and a solute. The solvent contains a glycol compound and a sulfone compound. A proportion of the glycol compound contained in the solvent is 10% by mass or more. A proportion of the sulfone compound contained in the solvent is 30% by mass or more. A total proportion of the glycol compound and the sulfone compound contained in the solvent is 70% by mass or more.

According to the present disclosure, there can be provided an electrolytic capacitor that has a small leakage current and an excellent heat resistance, and can maintain low ESR.

DETAILED DESCRIPTION OF EMBODIMENT

Figure 1:
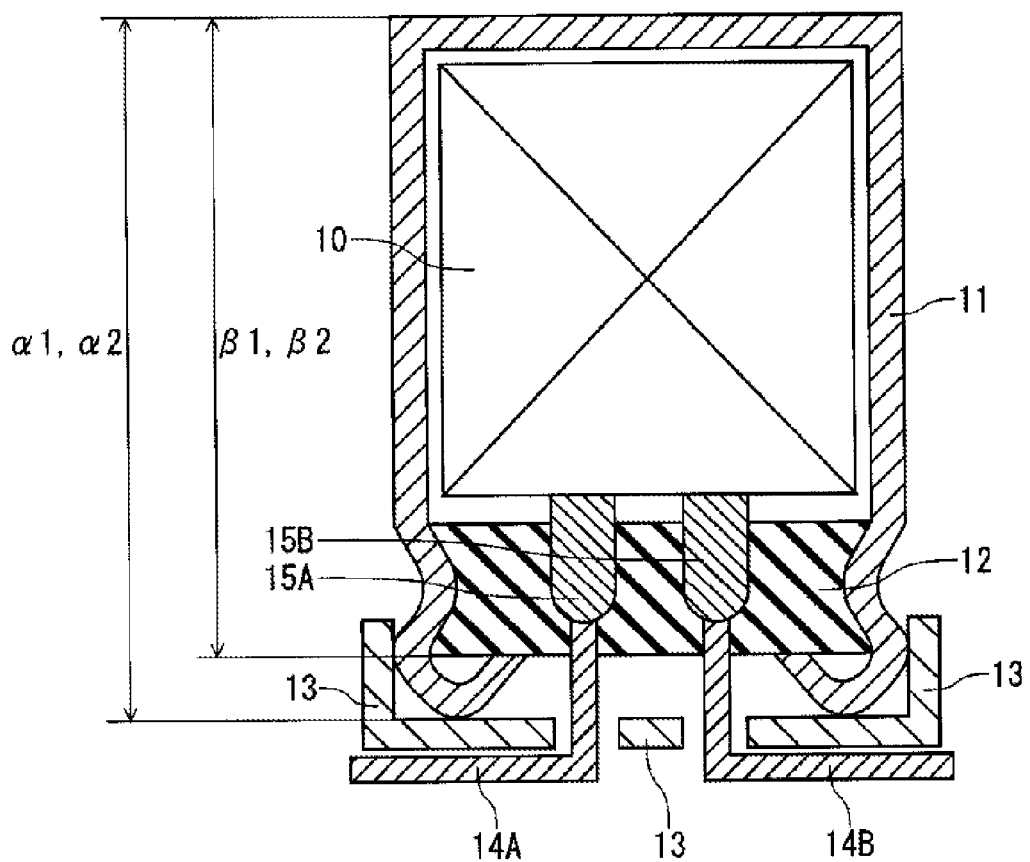
FIG. 1 is a schematic sectional view illustrating an electrolytic capacitor according to an exemplary embodiment of the present disclosure.

Prior to describing an exemplary embodiment of the present disclosure, problems in a conventional technique are briefly described. A solvent of an electrolyte solution permeates a sealing member to evaporate outside an electrolytic capacitor. This may cause a reduction of the electrolyte solution inside the electrolytic capacitor. The reduction of the electrolyte solution inside the electrolytic capacitor may cause a reduction in a proportion of a solid electrolyte layer covered with the electrolyte solution, so that oxidation deterioration of the solid electrolyte layer (π-conjugated conductive polymer) occurs and causes an increase in the ESR. Particularly, exposure of the electrolytic capacitor to a high temperature environment is further likely to reduce the electrolyte solution in the electrolytic capacitor, so that the oxidation deterioration of the solid electrolyte layer may be promoted. However, a relationship has not sufficiently been studied yet between composition of the solvent of the electrolyte solution and a degree of the solvent of the electrolyte solution evaporating outside the electrolytic capacitor.

In addition, for reducing the leakage current of the electrolytic capacitor, it is important for the electrolyte solution to have a function of restoring a defective part of a dielectric layer (oxide film).

In view of circumstances described above, the present disclosure provides an electrolytic capacitor that has a small leakage current and an excellent heat resistance, and can maintain low ESR.

The electrolytic capacitor according to the present disclosure includes an anode body having a dielectric layer; a solid electrolyte layer in contact with the dielectric layer; and an electrolyte solution. The solid electrolyte layer includes a π-conjugated conductive polymer, and the electrolyte solution contains a solvent and a solute. The solvent contains a glycol compound and a sulfone compound. A proportion of the glycol compound contained in the solvent is 10% by mass or more, a proportion of the sulfone compound contained in the solvent is 30% by mass or more, and a total proportion of the glycol compound and the sulfone compound contained in the solvent is 70% by mass or more.

The electrolyte solution containing the solvent having the composition described above can suppress the reduction of the electrolyte solution caused by the solvent permeating a sealing member to evaporate outside the electrolytic capacitor. Further, the oxidation deterioration of the solid electrolyte layer (π-conjugated conductive polymer) accompanied by the reduction of the electrolyte solution can be suppressed. Consequently, the ESR of the electrolytic capacitor can maintain low. Even when the electrolytic capacitor is exposed to a high temperature environment over a long period, the electrolyte solution containing the solvent having the composition described above can suppress the oxidation deterioration of the solid electrolyte layer so that the heat resistance of the electrolytic capacitor can be improved.

The π-conjugated conductive polymer is considered to be swollen by the glycol compound. A swollen π-conjugated conductive polymer is likely to cause rearrangement, so that orientation or crystallinity of the π-conjugated conductive polymer is considered to be improved. The solvent contains 10% by mass or more of the glycol compound to increase the orientation or the crystallinity of the π-conjugated conductive polymer included in the solid electrolyte layer. An increase in the orientation and the crystallinity of the π-conjugated conductive polymer improves conductivity of the solid electrolyte layer and reduces the ESR of the electrolytic capacitor.

The solvent containing 30% by mass or more of the sulfone compound can increase dissociability of the solute (salt) contained in the electrolyte solution. A dissociated solute (particularly, an acid component) can contribute to formation of an oxide film in a defective part of the dielectric layer so that the function of the electrolyte solution for restoring the dielectric layer can be improved. Consequently, the leakage current of the electrolytic capacitor can be reduced.

Hereinafter, the present disclosure is more specifically described with reference to the exemplary embodiment. The exemplary embodiment described below, however, is not to limit the present disclosure.

Figure 2:
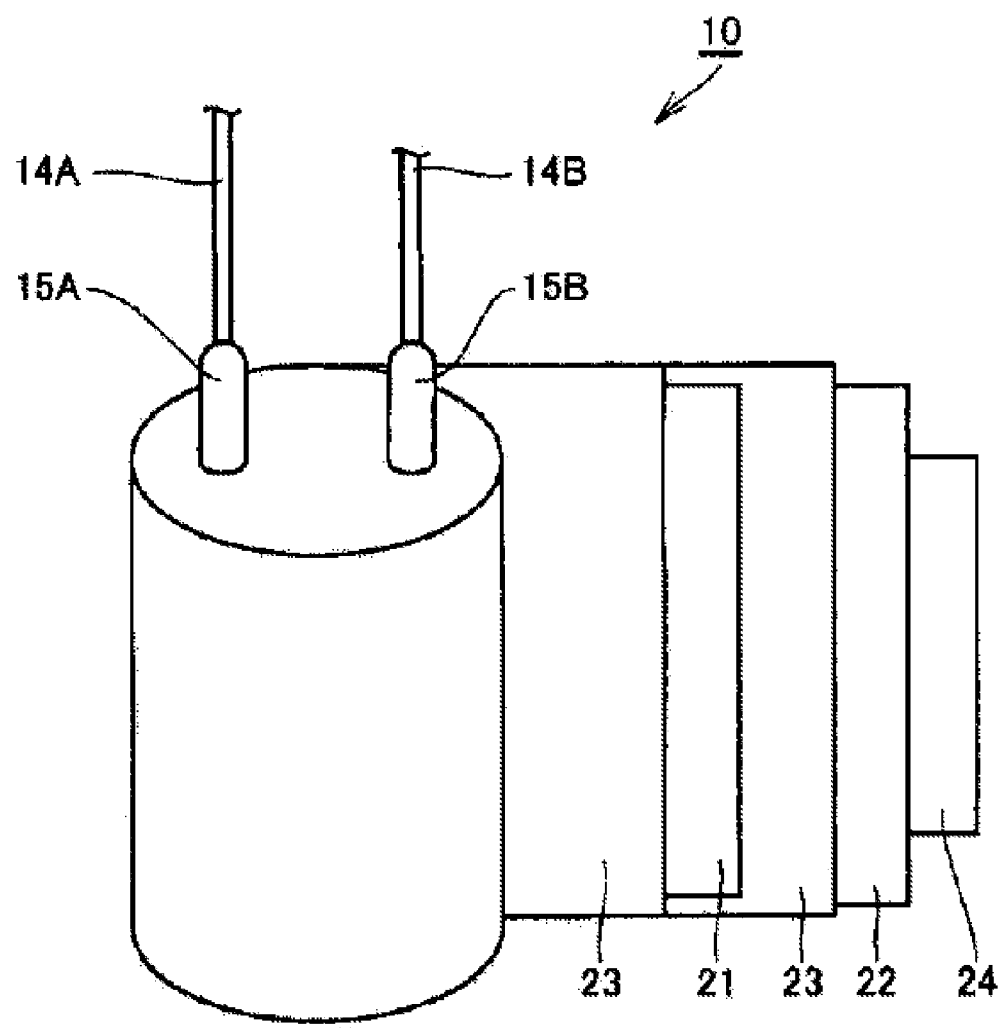
FIG. 2 is a schematic view illustrating a configuration of a capacitor element according to the exemplary embodiment.

FIG. 1 is a schematic sectional view illustrating an electrolytic capacitor according to the present exemplary embodiment, and FIG. 2 is a schematic view obtained by developing a part of a capacitor element of the electrolytic capacitor.

The electrolytic capacitor includes, for example, capacitor element 10, bottomed case 11 that houses capacitor element 10, sealing member 12 that seals an opening of bottomed case 11, base plate 13 that covers sealing member 12, lead wires 14A, 14B that are lead out from sealing member 12 and penetrate base plate 13, lead tabs 15A, 15B that connect the lead wires to electrodes of capacitor element 10, respectively, and an electrolyte solution (not shown). Bottomed case 11 is, at a part near an opening end, processed inward by drawing, and is, at the opening end, curled to swage sealing member 12.

Sealing member 12 is formed of an elastic material containing a rubber component. As the rubber component, there can be used a butyl rubber (IIR), a nitrile rubber (NBR), an ethylene propylene rubber, an ethylene propylene diene rubber (EPDM), a chloroprene rubber (CR), an isoprene rubber (IR), a Hypalon (trademark) rubber, a silicone rubber, and a fluorine-containing rubber. Sealing member 12 may contain fillers such as carbon black and silica.

Capacitor element 10 is formed of a wound body as illustrated in FIG. 2. The wound body is a semi-finished product of capacitor element 10 and refers to a capacitor element in which a solid electrolyte layer has not yet been formed between cathode body 22 and anode body 21 on a surface of which a dielectric layer is provided. The wound body includes anode body 21 connected to lead tab 15A, cathode body 22 connected to lead tab 15B, and separator 23.

Anode body 21 and cathode body 22 are wound with separator 23 interposed between the anode body and the cathode body. An outermost periphery of the wound body is fixed with fastening tape 24. FIG. 2 shows partially developed wound body before the outermost periphery of the wound body is fixed.

Anode body 21 includes a metal foil whose surface is roughened so as to have projections and recesses, and the dielectric layer is formed on the metal foil having the projections and recesses. A conductive polymer is attached to at least a part of a surface of the dielectric layer to form the solid electrolyte layer. The solid electrolyte layer may cover at least a part of a surface of cathode body 22 and/or at least a part of a surface of separator 23. Capacitor element 10 in which the solid electrolyte layer has been formed is housed in bottomed case 11 together with the electrolyte solution (not shown).

The electrolyte solution housed in bottomed case 11 contains a solvent and a solute, and the solvent contains a glycol compound and a sulfone compound. A proportion of the glycol compound contained in the solvent is 10% by mass or more, a proportion of the sulfone compound contained in the solvent is 30% by mass or more, and a total proportion of the glycol compound and the sulfone compound contained in the solvent is 70% by mass or more.

Figure 3:
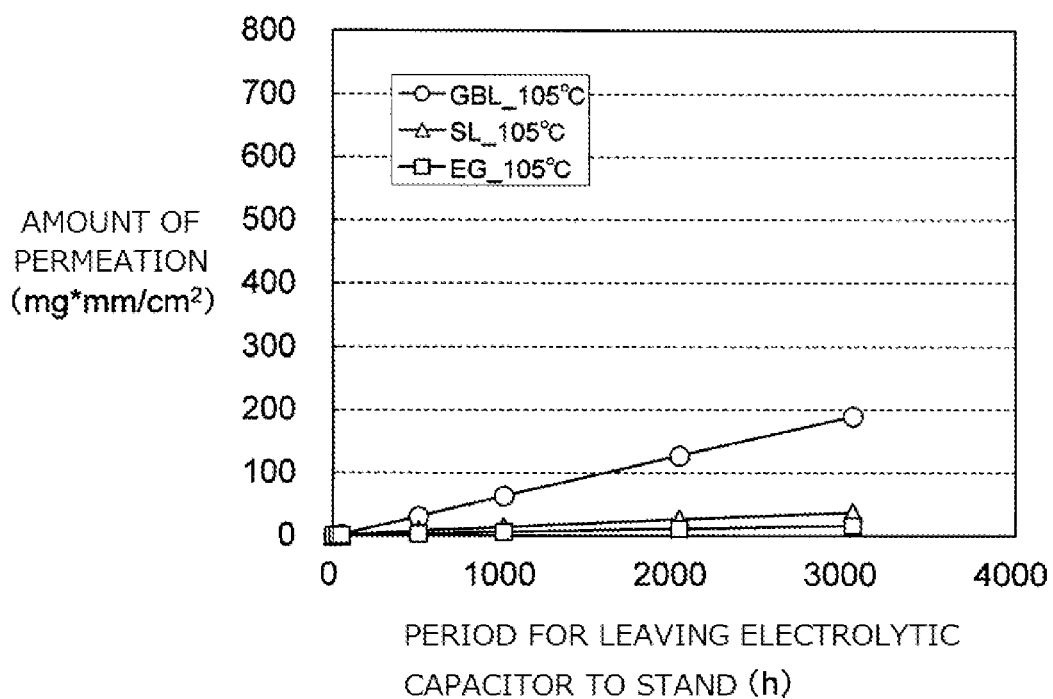
FIG. 3 is a graph showing permeability of various solvents to a sealing member in an environment at 105° C.
Figure 4:
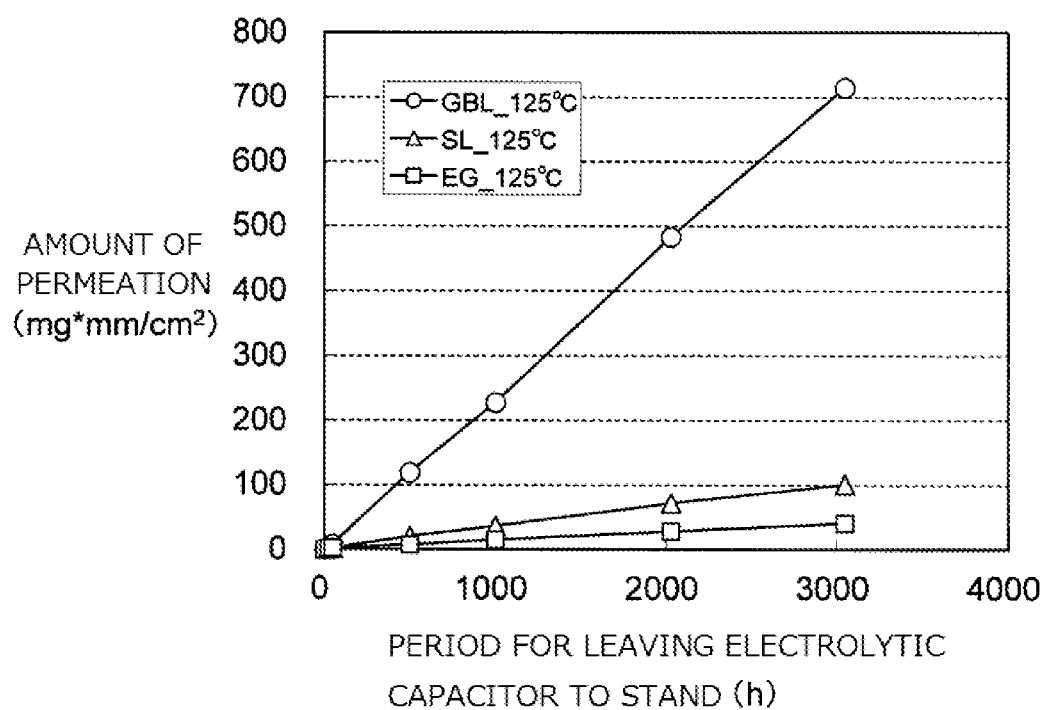
FIG. 4 is a graph showing permeability of the various solvents to the sealing member in an environment at 125° C.

Here, FIGS. 3 and 4 show results of studying permeability of the solvent to the sealing member. FIG. 3 shows permeability of various solvents in an environment at 105° C. FIG. 4 shows permeability of the various solvents in an environment at 125° C. As a rubber component included in the sealing member, a butyl rubber is used. Studies are conducted for three solvents, i.e., ethylene glycol (EG), sulfolane (SL), and γ-butyrolactone (GBL).

In the meantime, an evaluation test of the permeability of the solvent to the sealing member is performed by a method described below. When the electrolytic capacitor shown in FIG. 1 is produced, a predetermined amount of the solvents described above are housed in bottomed case 11 in place of the electrolyte solution. Then, bottomed case 11 is sealed with sealing member 12 to produce an electrolytic capacitor for evaluation. The electrolytic capacitor for evaluation is left to stand in a predetermined temperature environment and checked a change in weight over a period during which the electrolytic capacitor is left to stand. In checking the change, the reduced weight of the electrolytic capacitor over the period is defined as an amount of the solvent that has permeated sealing member 12.

EG and SL show low permeability in both the environments at 105° C. and 125° C. Particularly, EG shows low permeability even in the high temperature environment at 125° C. In contrast, GBL is higher in permeability than EG and SL, and shows much higher permeability in the high temperature environment at 125° C. than in the environment at 105° C. A reason for these results is not clear but is considered to relate to influence of, for example, the rubber component included in the sealing member, a SP (solubility parameter) value of the solvent, and vapor pressure of the solvent. In a high temperature environment at 125° C. or more, the permeability of γ-butyrolactone is considered to be further increased.

From the results described above, in order to reduce the permeability of the solvent even in a high temperature environment at 125° C. or more, it is advantageous to use as the solvent a glycol compound such as EG and a sulfone compound such as SL. It is particularly advantageous to use a glycol compound. On the other hand, in order to increase the function of the electrolyte solution for restoring the dielectric layer, it is advantageous to use as the solvent a sulfone compound such as SL. In addition, in order to reduce the ESR, it is advantageous to use, as the solvent, a glycol compound such as EG.

The inventors of the present disclosure have earnestly studied on a basis of the consideration described above and consequently found to be able to obtain the electrolytic capacitor that has a small leakage current, is excellent in heat resistance, and can maintain low ESR by using the electrolyte solution containing the solvent having the composition described above. Further, the use of such an electrolyte solution can sufficiently suppress the reduction of the electrolyte solution (solvent) even in a high temperature environment at 125° C. or more, so that the leakage current can be reduced and ESR of the electrolytic capacitor can maintain low. The use of the solvent having the composition described above can sufficiently suppress permeation of the solvent to sealing member 12 even in a high temperature environment at 125° C. or more.

From the viewpoint of reducing the ESR and improving the heat resistance of the electrolytic capacitor, the proportion of the glycol compound contained in the solvent ranges preferably from 10% by mass to 70% by mass, inclusive, more preferably from 30% by mass to 60% by mass, inclusive.

From the viewpoint of increasing the function of restoring the dielectric layer, the proportion of the sulfone compound contained in the solvent ranges preferably from 30% by mass to 90% by mass, inclusive, more preferably from 40% by mass to 70% by mass, inclusive.

From the viewpoint of reducing the ESR and improving the heat resistance of the electrolytic capacitor, the total proportion of the glycol compound and the sulfone compound contained in the solvent is preferably 80% by mass or more, more preferably 90% by mass or more.

Examples of the glycol compound include an alkylene glycol and a polyalkylene glycol having a weight average molecular weight of less than 300. The glycol compound referred to herein does not include a polyalkylene glycol having a weight average molecular weight of 300 or more. More specific examples of the glycol compound include ethylene glycol, propylene glycol, butylene glycol, pentylene glycol, hexylene glycol, diethylene glycol, triethylene glycol, tetraethylene glycol, pentaethylene glycol, and hexaethylene glycol. These glycol compounds may be used alone or in combination of two or more glycol compounds.

Especially, the glycol compound is preferably ethylene glycol. Ethylene glycol is low in viscosity among glycol compounds, so that ethylene glycol easily dissolves a solute. Further, ethylene glycol is high in heat conductivity and is excellent in heat dissipation when a ripple current has occurred, so that ethylene glycol has a large effect of improving the heat resistance.

The sulfone compound is an organic compound having a sulfonyl group ($—SO_2—$) in a molecule of the organic compound. Examples of the sulfone compound include a chain sulfone and a cyclic sulfone. Examples of the chain sulfone include dimethyl sulfone, diethyl sulfone, dipropyl sulfone, and diphenyl sulfone. Examples of the cyclic sulfone include sulfolane, 3-methyl sulfolane, 3,4-dimethyl sulfolane, and 3,4-diphenyl-methyl sulfolane. Especially, from the viewpoint of dissociability and thermal stability of a solute, the sulfone compound is preferably sulfolane. Sulfolane is low in viscosity among sulfone compounds, so that sulfolane easily dissolves a solute.

The solvent may contain another component than the glycol compound and the sulfone compound at a proportion of 30% by mass or less. Examples of the other component include a lactone compound and a carbonate compound. Examples of the lactone compound include γ-butyrolactone (GBL) and γ-valerolactone. Examples of the carbonate compound include dimethyl carbonate (DMC), diethyl carbonate (DEC), ethyl methyl carbonate (EMC), ethylene carbonate (EC), propylene carbonate (PC), and fluoroethylene carbonate (FEC). These other components may be used alone or in combination of two or more other components. Especially, from the viewpoint of the thermal stability, the other component is preferably a lactone compound, more preferably GBL. Although GBL easily evaporates, using the solvent containing GBL at a proportion of 30% by mass or less can suppress the oxidation deterioration of the solid electrolyte layer and a mounting defect of the electrolytic capacitor due to distortion of the sealing member caused by an increase in internal pressure of the electrolytic capacitor, in comparison with a case of using the solvent containing GBL at a proportion of more than 30% by mass. The proportion of GBL contained in the solvent is preferably 10% by mass or less, and more preferably, the solvent contains no GBL.

Further, the solvent may contain, as the other component, a polyalkylene glycol having a weight average molecular weight ranging from about 300 to about 1000, inclusive. The solvent containing such a polyalkylene glycol can suppress generation of a short circuit in the electrolytic capacitor. Examples of the polyalkylene glycol include polyethylene glycol, polypropylene glycol, and polybutylene glycol. A proportion of the polyalkylene glycol having a weight average molecular weight ranging from about 300 to about 1000, inclusive, which is contained in the solvent, preferably ranges from 5% by mass to 30% by mass, inclusive. In the present exemplary embodiment, a polyalkylene glycol having a weight average molecular weight of more than 1000 is not to be contained in the solvent of the electrolyte solution because such a polyalkylene glycol is less likely to dissolve a solute. Further, from the viewpoint of suppressing an increase in ESR of the electrolytic capacitor in a low temperature environment, the polyalkylene glycol preferably has a weight average molecular weight of 600 or less.

The solute preferably includes, as an acid component, an organic carboxylic acid compound. And the solute preferably includes, as a base component, an amine compound, a quaternary amidinium compound, or a quaternary ammonium compound. The solute preferably includes a primary to tertiary ammonium salt of an organic carboxylic acid, a quaternary amidinium salt of an organic carboxylic acid, or a quaternary ammonium salt of an organic carboxylic acid. The electrolyte solution containing such a solute is excellent in the function of restoring a defective part of the dielectric layer (oxide film) of the anode body so that the leakage current can be reduced. Further, the electrolyte solution containing such a solute is excellent in thermal stability and the reduction of the electrolyte solution is suppressed as described above. Thus, the function restoring a defective part of the dielectric layer is sufficiently exhibited over a long period even in a high temperature environment so that the leakage current of the electrolytic capacitor can maintain low. The base components and solutes exemplified above may be used alone or in combination of two or more base components and solutes.

A proportion of the solute that is contained in the electrolyte solution ranges preferably from 5% by mass to 40% by mass, inclusive, more preferably 10% by mass to 35% by mass, inclusive, the solute including, as the acid component, an organic carboxylic acid compound, the solute including, as the base component, an amine compound, a quaternary amidinium compound, or a quaternary ammonium compound. The electrolyte solution containing the solute in such ranges sufficiently exhibits the function of restoring a defective part of the dielectric layer.

Examples of the organic carboxylic acid compound include aromatic carboxylic acids such as phthalic acid (ortho), isophthalic acid (meta), terephthalic acid (para), maleic acid, benzoic acid, salicylic acid, trimellitic acid, and pyromellitic acid, and aliphatic carboxylic acids such as adipic acid. Especially, from the viewpoint of the function of the electrolyte solution for restoring the dielectric layer and the thermal stability of the electrolyte solution, phthalic acid is preferable.

The amine compound preferably includes at least one selected from the group consisting of a primary amine compound, a secondary amine compound, and a tertiary amine compound. Such an amine compound can increase the heat resistance of the electrolyte solution to increase the thermal stability of the electrolytic capacitor. As the amine compound, it is possible to use an aliphatic amine, an aromatic amine, and a heterocyclic amine. However, an aliphatic amine having a molecular weight ranging from 72 to 102, inclusive, is preferable because such an aliphatic amine has a high degree of dissociation.

Examples of the primary to tertiary amine compound include methyl amine, dimethyl amine, monoethyldimethyl amine, trimethyl amine, ethyl amine, diethyl amine, triethyl amine, ethylene diamine, N,N-diisopropylethyl amine, tetramethylethylene diamine, hexamethylene diamine, spermidine, spermine, amantadine, aniline, phenethylamine, toluidine, pyrrolidine, piperidine, piperazine, morpholine, imidazole, imidazoline, pyridine, pyridazine, pyrimidine, pyrazine, and 4-dimethylaminopyridine. These amine compounds may be used alone or in combination of two or more amine compounds. Among these amine compounds, particularly preferred are tertiary amines such as triethyl amine and monoethyldimethyl amine.

The quaternary amidinium compound is preferably a quaternized cyclic amidine compound, and more preferably includes at least one selected from the group consisting of a quaternary imidazolinium compound and a quaternary imidazolium compound. The quaternary amidinium compound is an amidinium cation. Such a quaternary amidinium compound can increase electrical conductivity of the electrolyte solution and further reduce the ESR.

Examples of the quaternary imidazolium compound include 1,3-dimethylimidazolium, 1,2,3-trimethylimidazolium, 1-ethyl-3-methylimidazolium, 1-ethyl-2,3-dimethylimidazolium, 1,3-diethylimidazolium, 1,2-diethyl-3-methylimidazolium, and 1,3-diethyl-2-methylimidazolium. Especially, from the viewpoint of electrochemical stability, preferred are 1-ethyl-3-methylimidazolium and 1-ethyl-2,3-dimethylimidazolium.

Examples of the quaternary imidazolinium compound include 1,3-dimethylimidazolinium, 1,2,3-trimethylimidazolinium, 1-ethyl-3-methylimidazolinium, 1-ethyl-2,3-dimethylimidazolinium, 1,3-diethylimidazolinium, 1,2-diethyl-3-methylimidazolinium, 1,3-diethyl-2-methylimidazolinium, and 1,2,3,4-tetramethylimidazolinium. Especially, from the viewpoint of electrochemical stability, preferred are 1,2,3,4-tetramethylimidazolinium and 1-ethyl-2,3-dimethylimidazolinium. Examples of the quaternary ammonium compound include diethyldimethylammonium and monoethyltrimethyl ammonium.

In order to further suppress deterioration of the solid electrolyte layer, the acid component is preferred to be included more than the base component. The acid component initially decreases pH of the electrolyte solution to suppress dedoping of a dopant from a conductive polymer. The solute including the acid component more than the base component can suppress the dedoping of a dopant from a conductive polymer and the deterioration of the solid electrolyte layer accompanied by the dedoping. In addition, also in terms of the fact that the acid component contributes to the function of the electrolyte solution for restoring the dielectric layer, the solute is preferred to include the acid component more than the base component.

From the viewpoint of suppressing the deterioration of the solid electrolyte layer and improving the function of the electrolyte solution for restoring the dielectric layer, a molar ratio of the acid component to the base component (acid component/base component) preferably ranges from 1.1 to 10.0, inclusive.

The electrolyte solution preferably further contains a boric acid ester compound. Hydrolysis of a boric acid ester can reduce an amount of moisture in the electrolytic capacitor. The reduction of the amount of moisture in the electrolytic capacitor can suppress an increase in internal pressure of the electrolytic capacitor that occurs during reflow and is caused by vaporization of moisture in the electrolytic capacitor, and suppress a mounting defect of the electrolytic capacitor due to distortion of the sealing member caused by the increase in internal pressure of the electrolytic capacitor. In the present exemplary embodiment, the boric acid ester compound is not contained as the solvent of the electrolyte solution because the boric acid ester compound dissolves almost no solute.

The boric acid ester compound preferably includes at least one of a condensate of boric acid with a polyalkylene glycol and a condensate of boric acid with a polyalkylene glycol monoalkyl ether. Examples of the polyalkylene glycol include polyethylene glycols such as diethylene glycol and triethylene glycol. A molecular weight of the polyethylene glycol ranges, for example, from about 100 to about 2000, inclusive. Examples of the polyalkylene glycol monoalkyl ether include polyethylene monoalkyl ethers such as triethylene glycol monomethyl ether and tetraethylene glycol monoethyl ether. A molecular weight of the polyethylene monoalkyl ether ranges, for example, from about 120 to about 2000, inclusive. A content of the boric acid ester compound in a whole electrolyte solution (including the boric acid ester compound) ranges preferably from 5% by mass to 40% by mass, inclusive, more preferably from 10% by mass to 30% by mass, inclusive.

The solid electrolyte layer includes a π-conjugated conductive polymer. The π-conjugated conductive polymer is preferably, for example, polypyrrole, polythiophene, or polyaniline. These π-conjugated conductive polymers may be used alone or in combination of two or more π-conjugated conductive polymers, or the π-conjugated conductive polymer may be a copolymer of two or more monomers.

In the present specification, polypyrrole, polythiophene, polyaniline, and the like mean polymers having, as a basic skeleton, polypyrrole, polythiophene, polyaniline, and the like, respectively. Therefore, polypyrrole, polythiophene, polyaniline, and the like also include derivatives of polypyrrole, polythiophene, polyaniline, and the like, respectively. For example, polythiophene includes poly (3,4-ethylenedioxythiophene) (PEDOT) and the like.

A weight average molecular weight of the π-conjugated conductive polymer is not particularly limited and ranges, for example, from 1000 to 100000, inclusive.

From the viewpoint of suppressing the dedoping of a dopant from the π-conjugated conductive polymer, the solid electrolyte layer desirably includes a polymer dopant. Examples of the polymer dopant include an anion of, for example, polyvinylsulfonic acid, polystyrenesulfonic acid, polyallylsulfonic acid, polyacrylsulfonic acid, polymethacrylsulfonic acid, poly (2-acrylamido-2-methylpropanesulfonic acid), polyisoprenesulfonic acid, and polyacrylic acid. These polymer dopants may be used alone or in combination of two or more polymer dopants. These polymer dopants may be a homopolymer or a copolymer of two or more monomers. Especially, polystyrenesulfonic acid (PSS) is preferable.

A weight average molecular weight of the polymer dopant is not particularly limited and preferably ranges, for example, from 1000 to 500000, inclusive, in terms of facilitating formation of a homogeneous solid electrolyte layer.

The solid electrolyte layer may be formed by a method for applying a solution containing, for example, a monomer, a dopant, and an oxidant to the dielectric layer to cause chemical polymerization or electrolytic polymerization on the dielectric layer. The solid electrolyte layer, however, is preferably formed by a method for applying the π-conjugated conductive polymer to the dielectric layer in terms of the fact that excellent withstand voltage characteristics can be expected. That is, the solid electrolyte layer is preferably formed by impregnating the dielectric layer with a polymer dispersion containing a liquid component and the π-conjugated conductive polymer dispersed in the liquid component (particularly, a polymer dispersion containing the π-conjugated conductive polymer and the polymer dopant), forming a film that covers at least a part of the dielectric layer, and then volatilizing the liquid component from the film. The electrolyte solution described above is particularly effective for suppressing deterioration of the π-conjugated conductive polymer contained in the polymer dispersion, and is also effective for improving the orientation of the π-conjugated conductive polymer.

A concentration of the π-conjugated conductive polymer contained in the polymer dispersion preferably ranges from 0.5% by mass to 10% by mass, inclusive. An average particle diameter D50 of the π-conjugated conductive polymer preferably ranges from 0.01 m to 0.5 m inclusive, for example. Here, the average particle diameter D50 is a median diameter in a volume particle size distribution obtained by a particle size distribution measuring apparatus according to dynamic light scattering. The polymer dispersion having such a concentration is suitable for forming a solid electrolyte layer having an appropriate thickness and is easily impregnated into the dielectric layer.

<Method for Producing Electrolytic Capacitor>

Hereinafter, steps of one exemplary method for producing the electrolytic capacitor according to the present exemplary embodiment are described.

(i) Step of Preparing Anode Body 21 Having Dielectric Layer

First, a metal foil as a raw material for anode body 21 is prepared. A type of the metal is not particularly limited, but it is preferred to use a valve metal such as aluminum, tantalum, or niobium, or an alloy including a valve metal, from the viewpoint of facilitating formation of the dielectric layer.

Next, a surface of the metal foil is roughened. A plurality of projections and recesses are formed on the surface of the metal foil by the roughening. The roughening is preferably performed by etching the metal foil. The etching may be performed by, for example, a direct-current electrolytic method or an alternating-current electrolytic method.

Next, a dielectric layer is formed on the roughened surface of the metal foil. A method for forming the dielectric layer is not particularly limited, and the dielectric layer can be formed by subjecting the metal foil to an anodizing treatment. The anodizing treatment is performed by, for example, immersing the metal foil in an anodizing solution such as an ammonium adipate solution followed by a heat treatment. The anodizing treatment may also be performed by applying a voltage to the metal foil that has been immersed in the anodizing solution.

Normally, a large foil of, for example, a valve metal (metal foil) is subjected to the roughening treatment and the anodizing treatment from the viewpoint of mass productivity. In this case, the treated foil is cut into a desired size to prepare anode body 21.

(ii) Step of Preparing Cathode Body 22

A metal foil can also be used for cathode body 22 as with the anode body. A type of the metal is not particularly limited, but it is preferred to use a valve metal such as aluminum, tantalum, or niobium, or an alloy including a valve metal. A surface of cathode body 22 may be roughened as necessary.

(iii) Producing of Wound Body (Capacitor Element 10)

Next, anode body 21 and cathode body 22 are used to produce a wound body. First, anode body 21 and cathode body 22 are wound with separator 23 interposed between the anode body and the cathode body. At this time, the winding can be conducted while lead tabs 15A, 15B are rolled in the anode body, the cathode body, and the separator, to cause lead tabs 15A, 15B to stand up from the wound body as illustrated in FIG. 2.

As a material for separator 23, a nonwoven fabric can be used that includes, as a main component, for example, natural cellulose, synthetic cellulose, polyethylene terephthalate, vinylon, or an aramid fiber.

A material for lead tabs 15A, 15B is not also particularly limited as long as the material is a conductive material. A material for lead wires 14A, 14B connected to lead tabs 15A, 15B, respectively, is not also particularly limited as long as the material is a conductive material.

Next, fastening tape 24 is disposed on an outer surface of cathode body 22 positioned at an outermost layer of wound anode body 21, cathode body 22, and separator 23, to fix an end of cathode body 22 with fastening tape 24. When anode body 21 is prepared by cutting a large metal foil, the wound body may further be subjected to an anodizing treatment in order to provide a dielectric layer on a cut surface of anode body 21.

(iv) Step of Forming Capacitor Element 10

Next, the dielectric layer is impregnated with a polymer dispersion to form a film covering at least a part of the dielectric layer. The polymer dispersion contains a liquid component and a π-conjugated conductive polymer dispersed in the liquid component. The polymer dispersion may be a solution obtained by dissolving the π-conjugated conductive polymer in the liquid component, or a dispersion liquid obtained by dispersing particles of the π-conjugated conductive polymer in the liquid component. Next, the formed film is dried to volatilize the liquid component from the film, forming a dense solid electrolyte layer covering at least a part of the dielectric layer. The polymer dispersion is uniformly distributed in the liquid component to easily form a uniform solid electrolyte layer. Thus, capacitor element 10 can be obtained.

The polymer dispersion can be obtained by, for example, a method for dispersing the π-conjugated conductive polymer in the liquid component or a method for polymerizing a precursor monomer in the liquid component and generating particles of the π-conjugated conductive polymer. Preferable examples of the polymer dispersion include poly (3,4-ethylenedioxythiophene) (PEDOT) doped with polystyrenesulfonic acid (PSS), i.e., PEDOT/PSS. Although an antioxidant for the π-conjugated conductive polymer may be added, it is unnecessary to use an antioxidant because PEDOT/PSS is unlikely to oxidize.

The liquid component may be water, a mixture of water and a nonaqueous solvent, or a nonaqueous solvent. The nonaqueous solvent is not particularly limited, and a protic solvent and an aprotic solvent can be used, for example. Examples of the protic solvent include alcohols such as methanol, ethanol, propanol, butanol, ethylene glycol, and propylene glycol, formaldehyde, and ethers such as 1,4-dioxane. Examples of the aprotic solvent include amides such as N-methylacetamide, N,N-dimethylformamide, and N-methyl-2-pyrrolidone, esters such as methyl acetate, and ketones such as methyl ethyl ketone.

The method for applying the polymer dispersion to a surface of the dielectric layer is preferably a method for immersing the wound body in the polymer dispersion housed in a container because the method is simple. An immersion period depends on a size of the wound body, but ranges, for example, from 1 second to 5 hours, inclusive, preferably from 1 minute to 30 minutes, inclusive. In addition, impregnation is preferably performed under a reduced pressure, in an atmosphere ranging, for example, from 10 kPa to 100 kPa, inclusive, preferably from 40 kPa to 100 kPa, inclusive. Further, ultrasonic vibration may be applied to the wound body or the polymer dispersion while the wound body is immersed in the polymer dispersion. The drying after picking the wound body up from the polymer dispersion is performed at a temperature ranging preferably from 50° C. to 300° C., inclusive, more preferably from 100° C. to 200° C., inclusive, for example.

The step of applying the polymer dispersion to the surface of the dielectric layer and the step of drying the wound body may be repeated two or more times. These steps can be performed a plurality of times to increase coverage of the solid electrolyte layer on the dielectric layer. In the steps, the solid electrolyte layer may be formed on not only the surface of the dielectric layer but also surfaces of cathode body 22 and separator 23.

As described above, the solid electrolyte layer is formed between anode body 21 and cathode body 22 to produce capacitor element 10. The solid electrolyte layer formed on the surface of the dielectric layer actually functions as a cathode material.

(v) Step of Preparing Electrolyte Solution and Impregnating Capacitor Element 10 with Electrolyte Solution Next, a solute (an acid component and a base component) is dissolved in a solvent to prepare an electrolyte solution, and then capacitor element 10 is impregnated with the electrolyte solution. A method for impregnating capacitor element 10 with the electrolyte solution is not particularly limited. For example, a method for immersing capacitor element 10 in the electrolyte solution housed in a container is simple and preferred. An immersion period depends on a size of capacitor element 10, and ranges, for example, from 1 second to 5 minutes, inclusive. Impregnation is preferably performed under a reduced pressure, in an atmosphere ranging, for example, from 10 kPa to 100 kPa, inclusive, preferably from 40 kPa to 100 kPa, inclusive.

(iv) Step of Encapsulating Capacitor Element

Next, capacitor element 10 is encapsulated. Specifically, first, capacitor element 10 is housed in bottomed case 11 so that lead wires 14A, 14B are positioned on an open upper surface of bottomed case 11. As a material for bottomed case 11, there can be used metals such as aluminum, stainless steel, copper, iron and brass, or alloys of these metals.

Next, sealing member 12 formed so as to allow lead wires 14A, 14B to penetrate the sealing member is disposed above capacitor element 10 to encapsulate capacitor element 10 in bottomed case 11. Next, bottomed case 11 is, at a part near an opening end, processed by transverse drawing, and is, at the opening end, curled to swage sealing member 12. Then, base plate 13 is disposed on a curled part of the bottomed case to complete the electrolytic capacitor as illustrated in FIG. 1. Then, an aging treatment may be performed while a rated voltage is applied.

In the exemplary embodiment described above, a wound electrolytic capacitor has been described. The application range of the present disclosure, however, is not limited to the wound electrolytic capacitor and can also be applied to other electrolytic capacitors such as a chip electrolytic capacitor including a metal sintered body as an anode body, and a laminated electrolytic capacitor including a metal plate as an anode body.

EXAMPLES

Hereinafter, the present disclosure is described in more detail with reference to examples. The present disclosure, however, is not limited to the examples.

Examples 1 to 16 and Comparative Examples 1 to 6

In the present example, a wound electrolytic capacitor (Φ10.0 mm×L (length) 10.0 mm) having a rated voltage of 25 V and a rated electrostatic capacity of 330 μF was produced. Hereinafter, a specific method for producing the electrolytic capacitor is described.

(Preparation of Anode Body)

A 105-μm-thick aluminum foil was subjected to etching to roughen a surface of the aluminum foil. Then, a dielectric layer was formed on the surface of the aluminum foil by an anodizing treatment. The anodizing treatment was performed by immersing the aluminum foil in an ammonium adipate solution and applying a voltage of 45 V to the aluminum foil. Then, the aluminum foil was cut into a size of 5.3 mm (length)×180 mm (width) to prepare an anode body.

(Preparation of Cathode Body)

A 50-μm-thick aluminum foil was subjected to etching to roughen a surface of the aluminum foil. Then, the aluminum foil was cut into a size of 5.3 mm (length)×180 mm (width) to prepare a cathode body.

(Producing of Wound Body)

An anode lead tab and a cathode lead tab were connected to the anode body and the cathode body, respectively, and the anode body and the cathode body were wound with a separator interposed between the anode body and the cathode body while the lead tabs were rolled in the anode body, the cathode body, and the separator. Ends of the lead tabs protruding from the wound body were connected to an anode lead wire and a cathode lead wire, respectively. Then, the produced wound body was subjected to an anodizing treatment again to form a dielectric layer at a cutting end of the anode body. Next, an end of an outer surface of the wound body was fixed with a fastening tape to complete the wound body.

(Preparation of Polymer Dispersion)

A mixed solution was prepared by dissolving 3,4-ethylenedioxythiophene and a polymer dopant, i.e., polystyrenesulfonic acid (PSS, weight average molecular weight 100000) in ion-exchanged water (liquid component). While the mixed solution was stirred, iron (III) sulfate (oxidant) that had been dissolved in ion-exchanged water was added to the mixed solution to cause a polymerization reaction. After the reaction, a resultant reaction solution was dialyzed to remove unreacted monomers and an excessive oxidant, so that a polymer dispersion was obtained that contained about 5% by mass of poly (3,4-ethylene dioxythiophene) doped with PSS (PEDOT/PSS).

(Formation of Solid Electrolyte Layer)

The wound body was immersed in the polymer dispersion housed in a predetermined container in a reduced-pressure atmosphere (40 kPa) for 5 minutes, and then the wound body was picked up from the polymer dispersion. Next, the wound body that had been impregnated with the polymer dispersion was dried in a drying furnace at 150° C. for 20 minutes to form a solid electrolyte layer covering at least a part of the dielectric layer.

(Preparation of Electrolyte Solution)

Ethylene glycol (EG) as a glycol compound, sulfolane (SL) as a sulfone compound, and γ-butyrolactone (GBL) as a lactone compound were used as a solvent of an electrolyte solution. For an acid component of a solute, phthalic acid (ortho) was used as an organic carboxylic acid compound. For a base component of the solute, triethyl amine (tertiary amine compound) was used as an amine compound. The solvent and the solute were used to prepare an electrolyte solution.

A ratio among EG, SL, and GBL contained in the solvent was set to the values shown in Tables 1 to 3. A content of the solute in a whole electrolyte solution was set to 25% by mass. A molar ratio of the acid component to the base component (acid component/base component) was set to 2.5. At least a part of the acid component (phthalic acid) was added as a salt (triethylamine phthalate) with the base component (triethyl amine).

(Impregnation with Electrolyte Solution)

The capacitor element was immersed in the electrolyte solution for 5 minutes in a reduced-pressure atmosphere (40 kPa) to impregnate the capacitor element with the electrolyte solution.

(Encapsulation of Capacitor Element)

The capacitor element that had been impregnated with the electrolyte solution was encapsulated to complete an electrolytic capacitor. Specifically, the capacitor element was housed in a bottomed case so that lead wires were positioned on an opening side of the bottomed case, and a sealing member (an elastic material including a butyl rubber as a rubber component) that was formed so as to allow the lead wires to penetrate the sealing member was disposed above the capacitor element so that the capacitor element was encapsulated in the bottomed case. The bottomed case was, at a part near an opening end, processed by drawing and was further curled at the opening end. And a base plate was disposed on a curled part to complete the electrolytic capacitor as illustrated in FIG. 1. Then, an aging treatment was performed at 100° C. for 2 hours while a voltage of 39 V was applied.

(Evaluation)

(a) Measurement of ESR

An ESR value (initial ESR value: X0) (mΩ) at a frequency of 100 kHz was measured in an environment at 20° C. for the electrolytic capacitor with an LCR meter for 4-terminal measurement. Further, in order to evaluate long term stability, the rated voltage was applied to the electrolytic capacitor at a temperature of 145° C. for 500 hours, and then the ESR value (X1) (mΩ) was measured by the same method as described above. Then, an increasing rate of the ESR (ΔESR) was acquired by an equation below.

$$\Delta ESR\ (\%) = (X1 - X0)/X0 \times 100$$

(b) Measurement of Occurrence Rate of Swelling in Electrolytic Capacitor

Ten electrolytic capacitors were prepared for each of the examples and comparative examples. Then, each of the electrolytic capacitors was measured with a microgauge for lengths α1 and β1 in FIG. 1. Then, the electrolytic capacitor was left to stand for 5 minutes while heated at 200° C., and the heated electrolytic capacitor was measured for lengths α2 and β2 in FIG. 1. Subsequently, a swelling amount of the sealing member was acquired by an equation below.

$$\text{Swelling amount (mm)} = (\beta2 - \beta1) - (\alpha2 - \alpha1)$$

An average value of 10 swelling amounts was acquired.

(c) Measurement of Leakage Current

The rated voltage was applied to the electrolytic capacitor in an environment at 20° C., and a leakage current (initial) was measured 2 minutes after the application. Further, in order to evaluate long term stability, the rated voltage was applied to the electrolytic capacitor at a temperature of 145° C. for 500 hours, and then the leakage current (after the electrolytic capacitor was left to stand at the high temperature) was measured by the same method as described above. Tables 1 to 3 show evaluation results.

TABLE 1

| | Composition of electrolyte solution Content of components in solvent | | | | Evaluation | | | | |
|---|---|---|---|---|---|---|---|---|---|
| | | | | | Initial | | Average swelling | Leakage current | Leakage current (after left to stand at high |
| | EG | SL | EG + SL | GBL | ESR (Ω) | ΔESR (%) | amount (mm) | (initial) (μA) | temperature) (μA) |
| Comparative Example 1 | — | — | — | 100 | 0.25 | 178 | 0.36 | 3.19 | 3.46 |
| Comparative Example 2 | 100 | — | — | — | 0.10 | 15 | 0.07 | 3.21 | 35.51 |
| Comparative Example 3 | — | 100 | — | — | 0.25 | 108 | 0.08 | 3.23 | 3.65 |
| Comparative Example 4 | 20 | 40 | 60 | 40 | 0.015 | 75 | 0.18 | 3.15 | 3.36 |
| Example 1 | 25 | 45 | 70 | 30 | 0.013 | 40 | 0.10 | 3.08 | 3.18 |
| Example 2 | 30 | 50 | 80 | 20 | 0.012 | 34 | 0.09 | 3.30 | 3.25 |
| Example 3 | 35 | 55 | 90 | 10 | 0.012 | 22 | 0.07 | 3.11 | 3.26 |
| Example 4 | 40 | 60 | 100 | — | 0.010 | 20 | 0.08 | 3.21 | 3.18 |

EG: ethylene glycol,
SL: sulfolane,
GBL: γ-butyrolactone

TABLE 2

| | Composition of electrolyte solution Content of components in solvent | | | | Evaluation | | | | |
|---|---|---|---|---|---|---|---|---|---|
| | | | | | Initial | | Average swelling | Leakage current | Leakage current (after left to stand at high |
| | EG | SL | EG + SL | GBL | ESR (Ω) | ΔESR (%) | amount (mm) | (initial) (μA) | temperature) (μA) |
| Comparative Example 5 | 5 | 65 | 70 | 30 | 0.025 | 112 | 0.13 | 3.36 | 3.33 |
| Example 5 | 10 | 60 | 70 | 30 | 0.018 | 73 | 0.12 | 3.28 | 3.25 |
| Example 6 | 15 | 55 | 70 | 30 | 0.015 | 72 | 0.11 | 3.12 | 3.18 |
| Example 7 | 20 | 50 | 70 | 30 | 0.014 | 70 | 0.10 | 3.33 | 3.12 |
| Example 1 | 25 | 45 | 70 | 30 | 0.013 | 40 | 0.10 | 3.08 | 3.18 |
| Example 8 | 30 | 40 | 70 | 30 | 0.013 | 31 | 0.10 | 2.98 | 3.21 |
| Example 9 | 35 | 35 | 70 | 30 | 0.012 | 24 | 0.09 | 3.06 | 3.18 |
| Example 10 | 40 | 30 | 70 | 30 | 0.010 | 22 | 0.09 | 3.12 | 3.17 |
| Comparative Example 6 | 45 | 25 | 70 | 30 | 0.012 | 23 | 0.08 | 3.20 | 5.18 |

EG: ethylene glycol,
SL: sulfolane,
GBL: γ-butyrolactone

TABLE 3

| | Composition of electrolyte solution Content of components in solvent | | | | Evaluation | | | | |
|---|---|---|---|---|---|---|---|---|---|
| | | | | | Initial | | Average swelling | Leakage current | Leakage current (after left to stand at high |
| | EG | SL | EG + SL | GBL | ESR (Ω) | ΔESR (%) | amount (mm) | (initial) (μA) | temperature) (μA) |
| Example 11 | 10 | 90 | 100 | — | 0.19 | 27 | 0.08 | 3.12 | 3.23 |
| Example 12 | 20 | 80 | 100 | — | 0.15 | 24 | 0.08 | 3.21 | 3.24 |
| Example 13 | 30 | 70 | 100 | — | 0.13 | 22 | 0.08 | 3.36 | 3.11 |
| Example 4 | 40 | 60 | 100 | — | 0.010 | 20 | 0.08 | 3.21 | 3.18 |
| Example 14 | 50 | 50 | 100 | — | 0.010 | 19 | 0.07 | 3.22 | 3.25 |
| Example 15 | 60 | 40 | 100 | — | 0.010 | 18 | 0.07 | 3.32 | 3.36 |
| Example 16 | 70 | 30 | 100 | — | 0.010 | 17 | 0.07 | 3.29 | 4.01 |

EG: ethylene glycol,
SL: sulfolane,
GBL: γ-butyrolactone

In Examples 1 to 16, low ESR and a low leakage current were maintained over a long period, and excellent heat resistance was obtained. In addition, the average swelling amount was small in Examples 1 to 16.

In Comparative Example 1 where only GBL that easily evaporated was used as the solvent, the average swelling amount increased. In Comparative Example 1, the electrolytic capacitor was exposed to the high temperature to increase a reduced amount of the solvent, causing the oxidation deterioration of the solid electrolyte layer to increase the ΔESR. In Comparative Examples 1 and 3 where EG was not used for the solvent, the initial ESR and the ΔESR increased. In Comparative Example 2 where SL was not used for the solvent, the function of restoring a defective part of the dielectric layer was deteriorated, increasing the leakage current after the electrolytic capacitor was left to stand at the high temperature.

In Comparative Example 4 where GBL that easily evaporated was much used for the solvent, the electrolytic capacitor was exposed to the high temperature to increase a reduced amount of the solvent, causing the oxidation deterioration of the solid electrolyte layer to increase the ΔESR. In Comparative Example 5, an amount of EG was small to increase the ΔESR. In Comparative Example 6, because an amount of SL was small, the function of restoring a defective part of the dielectric layer was deteriorated, increasing the leakage current after the electrolytic capacitor was left to stand at the high temperature.

Examples 17 to 22

An electrolytic capacitor was produced in the same manner as in Example 1 except that the components of the solvent were changed as shown in Table 4, and the evaluation was performed in the same manner. PG, DEG, and DMS in Table 4 denote propylene glycol, diethylene glycol, and dimethyl sulfone, respectively. PEG300, PEG400, and PEG600 in Table 4 denote polyethylene glycols having a weight average molecular weight of 300, 400, and 600, respectively. Table 4 shows evaluation results.

TABLE 4

| | Composition of electrolyte solution | | | Initial ESR (Ω) | ΔESR (%) | Evaluation Average swelling amount (mm) | Leakage current (initial) (μA) | Leakage current (after left to stand at high temperature) (μA) |
|---|---|---|---|---|---|---|---|---|
| | Glycol compound | Sulfone compound | Other component | | | | | |
| Example 1 | EG | SL | GBL | 0.013 | 40 | 0.10 | 3.08 | 3.18 |
| Example 17 | PG | SL | GBL | 0.017 | 52 | 0.11 | 3.25 | 3.16 |
| Example 18 | DEG | SL | GBL | 0.015 | 43 | 0.09 | 3.33 | 3.22 |
| Example 19 | EG | DMS | GBL | 0.011 | 38 | 0.08 | 2.99 | 3.15 |
| Example 20 | EG | SL | PEG300 | 0.011 | 25 | 0.07 | 3.18 | 3.20 |
| Example 21 | EG | SL | PEG400 | 0.013 | 28 | 0.07 | 3.21 | 3.33 |
| Example 22 | EG | SL | PEG600 | 0.016 | 29 | 0.07 | 3.25 | 3.35 |

EG: ethylene glycol, SL: sulfolane, GBL: γ-butyrolactone, PG: propylene glycol, DEG: diethylene glycol, DMS: dimethyl sulfone, PEG300: polyethylene glycol having a weight average molecular weight of 300, PEG400: polyethylene glycol having a weight average molecular weight of 400, PEG600: polyethylene glycol having a weight average molecular weight of 600

In any of the examples, low ESR and a low leakage current were maintained over a long period, and excellent heat resistance was obtained. In any of the examples, the swelling amount was small.

Examples 23 to 27

An electrolytic capacitor was produced in the same manner as in Example 1 except that the base component of the solute was changed as shown in Table 5, and the evaluation was performed in the same manner. As a primary amine compound, ethyl amine was used. As a secondary amine compound, diethyl amine was used. As a quaternary imidazolium compound, 1-ethyl-3-methylimidazolium was used. As a quaternary imidazolinium compound, 1,2,3,4-tetramethylimidazolinium was used. As a quaternary ammonium compound, diethyldimethylammonium was used. Table 5 shows evaluation results.

TABLE 5

| | Composition of electrolyte solution Base component of solute | Initial ESR (Ω) | ΔESR (%) | Evaluation Average swelling amount (mm) | Leakage current (initial) (μA) | Leakage current (after left to stand at high temperature) (μA) |
|---|---|---|---|---|---|---|
| Example 23 | Primary amine compound | 0.014 | 45 | 0.11 | 3.16 | 3.23 |
| Example 24 | Secondary amine compound | 0.013 | 43 | 0.11 | 3.32 | 3.31 |
| Example 1 | Tertiary amine compound | 0.013 | 40 | 0.10 | 3.08 | 3.18 |
| Example 25 | Quaternary imidazolium compound | 0.014 | 68 | 0.09 | 3.25 | 3.08 |
| Example 26 | Quaternary imidazolinium compound | 0.014 | 66 | 0.09 | 3.40 | 3.11 |
| Example 27 | Quaternary ammonium compound | 0.014 | 70 | 0.09 | 3.22 | 3.37 |

In any of the examples, low ESR and a low leakage current were maintained over a long period, and excellent heat resistance was obtained. In any of the examples, the swelling amount was small.

Examples 28 to 33

An electrolytic capacitor was produced in the same manner as in Example 1 except that the boric acid ester compound shown in Table 6 was further added to the electrolyte solution, and the evaluation was performed in the same manner. A content of the boric acid ester compound in the whole electrolyte solution was set to 10% by mass, 20% by mass, or 30% by mass. Table 6 shows evaluation results.

TABLE 6

| | Additive added to electrolyte solution | | Evaluation | | | | Leakage current (after left to stand at high temperature) (μA) |
|---|---|---|---|---|---|---|---|
| | Boric acid ester compound | Content in electrolyte solution (% by mass) | Initial ESR (Ω) | ΔESR (%) | Average swelling amount (mm) | Leakage current (initial) (μA) | |
| Example 1 | No additive | 0 | 0.013 | 40 | 0.10 | 3.08 | 3.18 |
| Example 28 | Condensate of boric acid with triethylene glycol | 10 | 0.014 | 42 | 0.05 | 3.26 | 3.41 |
| Example 29 | | 20 | 0.013 | 39 | 0.03 | 3.33 | 3.16 |
| Example 30 | | 30 | 0.013 | 37 | 0.03 | 3.33 | 3.25 |
| Example 31 | Condensate of boric acid with triethylene glycol monoethyl ether | 10 | 0.012 | 39 | 0.06 | 3.15 | 3.21 |
| Example 32 | | 20 | 0.013 | 40 | 0.04 | 3.42 | 3.36 |
| Example 33 | | 30 | 0.012 | 41 | 0.04 | 3.25 | 3.22 |

In Examples 28 to 33 where the boric acid ester compound was added to the electrolyte solution, the average swelling amount further decreased.

The present disclosure can be utilized for an electrolytic capacitor that includes a solid electrolyte layer covering at least a part of a dielectric layer, and an electrolyte solution.

What is claimed is:

1. An electrolytic capacitor comprising:
    a capacitor element including an anode body having a dielectric layer and a solid electrolyte layer in contact with the dielectric layer of the anode body;
    a case that houses the capacitor element;
    an electrolyte solution that is contained in the case; and
    a sealing member that seals an opening of the case, wherein:
    the solid electrolyte layer includes a π-conjugated conductive polymer,
    the electrolyte solution contains a solvent and a solute,
    the solvent contains a glycol compound other than a polyalkylene glycol having a weight average molecular weight of 300 or more, a sulfone compound, and a lactone compound,
    a proportion of the glycol compound contained in the solvent is 10% by mass or more,
    a proportion of the sulfone compound contained in the solvent is greater than 30% by mass,
    a total proportion of the glycol compound and the sulfone compound contained in the solvent is 70% by mass or more,
    a proportion of the lactone compound contained in the solvent is more than 0% by mass and less than or equal to 30% by mass, and
    the sealing member includes a butyl rubber.

2. The electrolytic capacitor according to claim 1, wherein:
    the solvent further contains the polyalkylene glycol having a weight average molecular weight of 300 or more.

3. The electrolytic capacitor according to claim 2, wherein a proportion of the polyalkylene glycol contained in the solvent ranges from 5% by mass to 30% by mass, inclusive.

4. The electrolytic capacitor according to claim 1, wherein the proportion of the sulfone compound contained in the solvent is more than the proportion of the glycol compound contained in the solvent.

5. The electrolytic capacitor according to claim 1, wherein the proportion of the sulfone compound contained in the solvent is greater than 40% by mass.

6. The electrolytic capacitor according to claim 1, wherein the proportion of the sulfone compound contained in the solvent is 50% by mass or more and 90% by mass or less.

7. The electrolytic capacitor according to claim 1, wherein the sulfone compound includes sulfolane.

8. The electrolytic capacitor according to claim 1, wherein the lactone compound includes γ-butyrolactone.

9. The electrolytic capacitor according to claim 1, wherein the proportion of the glycol compound contained in the solvent ranges from 10% by mass to 70% by mass, inclusive.

10. The electrolytic capacitor according to claim 1, wherein the glycol compound includes at least one selected from the group consisting of ethylene glycol, propylene glycol, butylene glycol, pentylene glycol, hexylene glycol, diethylene glycol, triethylene glycol, tetraethylene glycol, pentaethylene glycol, and hexaethylene glycol.

11. The electrolytic capacitor according to claim 1, wherein the glycol compound includes ethylene glycol.

12. The electrolytic capacitor according to claim 1, wherein:
    the solute includes an acid component and a base component, and
    a proportion of the solute contained in the electrolyte solution ranges from 10% by mass to 40% by mass, inclusive.

13. The electrolytic capacitor according to claim 12, wherein:
    the acid component includes an organic carboxylic acid compound, and
    the base component includes at least one selected from the group consisting of an amine compound, a quaternary amidinium compound, and a quaternary ammonium compound.

14. The electrolytic capacitor according to of claim 13, wherein the amine compound includes at least one selected from the group consisting of a primary amine compound, a secondary amine compound, and a tertiary amine compound.

15. The electrolytic capacitor according to of claim 13, wherein the quaternary amidinium compound includes at least one selected from the group consisting of a quaternary imidazolinium compound and a quaternary imidazolium compound.

16. The electrolytic capacitor according to of claim 1, wherein the electrolyte solution further contains a boric acid ester compound.

17. The electrolytic capacitor according to of claim 1, wherein the proportion of the lactone compound contained in the solvent is 10% by mass or more.

* * * * *